United States Patent [19]

Schnaibel et al.

[11] 3,829,168

[45] Aug. 13, 1974

[54] VEHICLE WHEEL BRAKE ANTI-LOCK SYSTEM

[75] Inventors: Eberhard Schnaibel, Hemmingen; Werner Götz, Friolzheim, both of Germany

[73] Assignee: Robert Bosch GmbH, Gerlingen-Schillerhoke, Germany

[22] Filed: Feb. 8, 1973

[21] Appl. No.: 330,674

[30] Foreign Application Priority Data

Feb. 12, 1972  Germany............................ 2206808

[52] U.S. Cl.......................... 303/21 BE, 188/181 A
[51] Int. Cl............................................... B60t 8/12
[58] Field of Search...... 188/181 A; 303/20, 21 AU; 324/162; 340/53, 262; 307/10 R

[56] References Cited
UNITED STATES PATENTS

| | | | |
|---|---|---|---|
| 3,398,995 | 8/1968 | Martin | 303/20 X |
| 3,524,685 | 8/1970 | Harned et al. | 303/20 X |
| 3,578,819 | 5/1971 | Atkins | 188/181 A X |
| 3,642,329 | 2/1972 | Zechnall et al. | 303/21 BE |
| 3,698,772 | 10/1972 | Nixon | 188/181 A X |
| 3,744,851 | 7/1973 | Burckhardt et al. | 303/20 X |
| 3,753,598 | 8/1973 | Michellone et al. | 303/21 F |

*Primary Examiner*—Trygve M. Blix
*Assistant Examiner*—Stephen G. Kunin
*Attorney, Agent, or Firm*—Flynn & Frishauf

[57] ABSTRACT

Acceleration or deceleration of wheels are sensed and a valve which either connects the wheel brake cylinder to a source of pressure fluid or to a drain is controlled in accordance with sensed acceleration or deceleration. A first threshold switch is responsive to wheel deceleration, a second switch is responsive to acceleration, and controls draining of pressurized brake fluid from the wheel brake cylinder.

17 Claims, 4 Drawing Figures

3,829,168

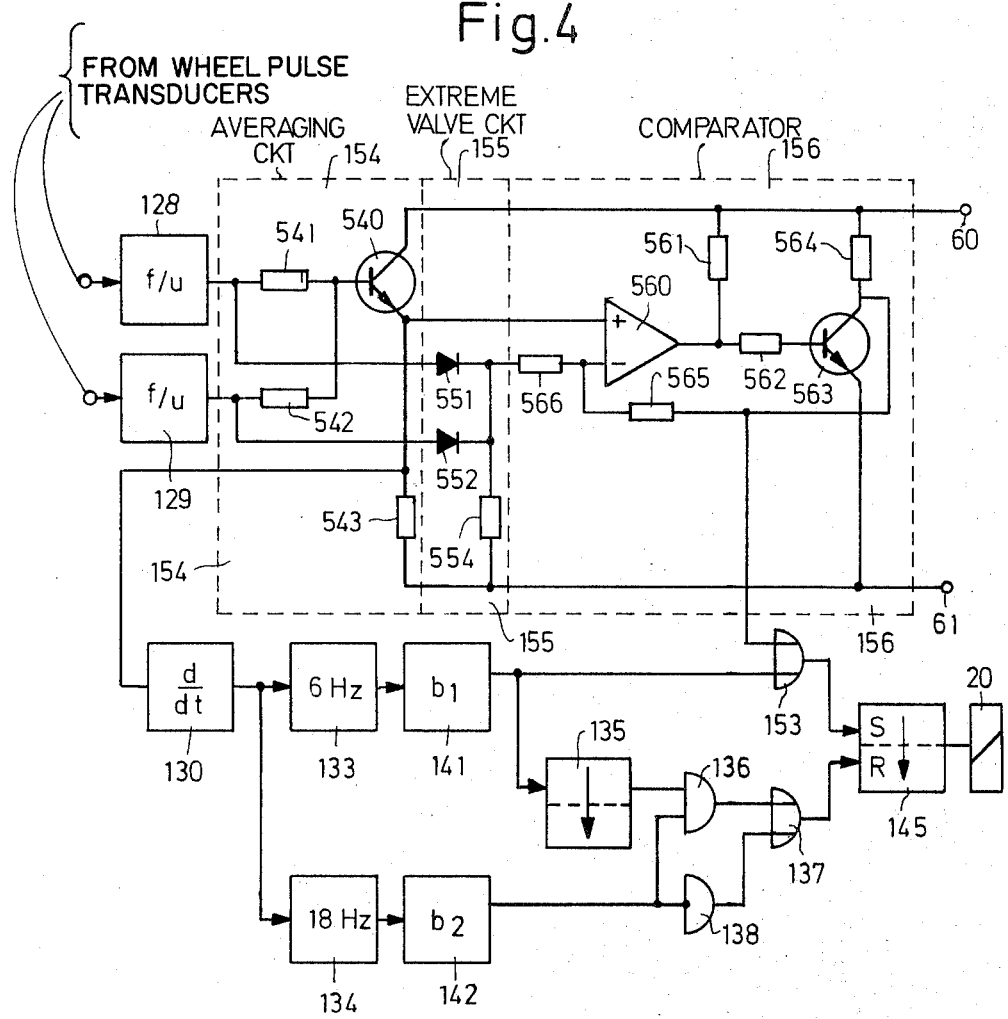

VEHICLE WHEEL BRAKE ANTI-LOCK SYSTEM

CROSS REFERENCE TO RELATED APPLICATIONS

U.S. Ser. No. 288,791, filed Sept. 13, 1972.
U.S. Ser. No. 325.569 filed: Jan. 22, 1973.
U.S. Ser. No. 328,047 filed: Jan. 30, 1973.

The present invention relates to a vehicle wheel anti-lock system and more particularly to an anti-lock system for automotive vehicles having pressure operated brakes, such as hydraulic brakes at their rear wheels.

Vehicle wheel anti-lock systems customarily utilize a device which provides an output signal representative of wheel speed. This output signal, when differentiated, provides the first derivative, that is, a signal representative of wheel acceleration or deceleration (which may be termed "negative acceleration") to control application of pressurized brake fluid to a wheel brake cylinder, or drainage of pressurized brake fluid from a wheel brake cylinder.

Control systems have been proposed in which each rear wheel has an acceleration sensing device associated therewith, connected to suitable circuits which respond at predetermined values of wheel deceleration. The electronic or electrical control circuit is then so arranged that the braking pressure is lowered in both rear wheels if the deceleration in any one rear wheel becomes excessive. The braking pressure is then increased again when the deceleration of the rear wheels has dropped below the response level of the acceleration sensors.

Wheel anti-lock systems, as described, thus provide for increase in braking pressure although the wheels themselves are still decelerating. The difference between circumferential wheel speed and vehicle speed becomes greater and greater at each control cycle so that the rear wheels will lock anyway after several cycles, particularly on smooth or slippery roads.

It is an object of the present invention to provide a wheel anti-lock system which reliably prevents locking of the rear wheels even on slippery or slick road surfaces. The invention relates to a system in which on-off control is to be used, that is, braking pressure should be either raised or lowered, thus permitting economy in equipment.

SUBJECT MATTER OF THE PRESENT INVENTION

Briefly, two (or more) threshold circuits are controlled by the acceleration sensing device. The outputs of the threshold circuits are connected, respectively, to the set and reset inputs of a storage device. The storage device itself controls an electrical winding which controls the position of a brake fluid control valve.

In accordance with a preferred feature of the invention, the threshold levels of the two threshold switches are so selected that the brake line valve is controlled to decrease braking pressure if a certain wheel deceleration is exceeded; braking pressure is increased only when a certain positive wheel acceleration is passed. During each control cycle, therefore, each wheel is accelerated during a portion of the cycle. The difference between wheel circumferential speed and vehicle speed remains essentially constant. It is possible to regulate this difference such that optimum slip between vehicle speed and circumferential wheel speed is always obtained by suitably selecting the threshold levels of the threshold switches.

The invention will be described by way of example with reference to the accompanying drawings, wherein:

FIG. 4 is a schematic block circuit diagram of another embodiment of the invention.

Figure 1:
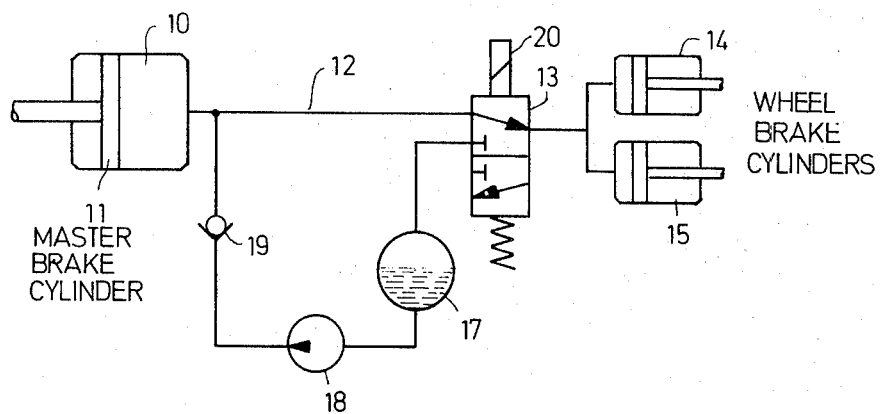
FIG. 1 is a schematic representation of a vehicle wheel braking system for the rear axle of an automotive vehicle.

A master brake cylinder 10 has a piston 11 operating therein. Piston 11 is adapted to be controlled by a brake pedal, a power brake system, or the like. Master brake cylinder 10 is connected over a pressure brake line 12 with a pressure control valve 13, to which brake cylinders 14, 15 of the rear wheels, for example, of a motor vehicle, are connected. The pressure valve 13 is a pressure control valve of the 3/2 path type, and can be deflected from its connected position shown in FIG. 1 to an operated position, upon energization of an electric winding 20, in which the wheel brake cylinders 14, 15 are connected to a sump 17. In the rest position, the valve 13 connects pressurized brake fluid from line 12 to the wheel brake cylinders 14, 15. Pressurized brake fluid can be drained from the brake cylinders 14, 15 to sump 17, when the valve is energized, from where the brake fluid is returned by a pump 18 and a check valve 19 to brake line 12. Braking pressure can thus be changed in the brake cylinders 14, 15 under control of piston 11, and can be raised in the brake cylinders when piston 11 is moved towards the right (FIG. 1) and braking pressure can be lowered when the valve 13 is moved in its operated condition by energization of winding 20.

Figure 2:
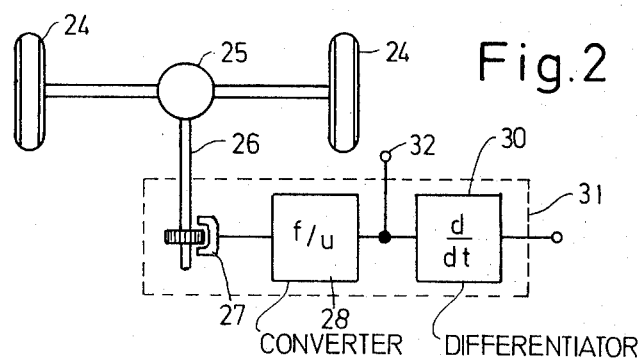
FIG. 2 is a schematic arrangement of an acceleration sensor.

The rear driven axle of a motor vehicle is shown in FIG. 2, to which wheels 24 are attached, driven over a differential 25 from the main drive shaft 26. A pulse transducer 27 is associated with drive shaft 26. It provides an alternating current output at its terminals, the frequency of which is proportional to rotational speed of drive shaft 26, thus proportional to the medium or average speed of the rear wheels 24. Pulse source 27 is connected to a frequency-voltage converter 28. At the output 32 of converter 28, a d-c signal representative of speed of the rear wheels is available. The amplitude of the signal is proportional to the speed of shaft 26.

A differentiator 30 is connected to the output of converter 28. Differentiator 30 thus provides an output signal representative of the first derivative of vehicle speed, thus representative of acceleration or deceleration of shaft 26. The assembly of transducer 27, converter 28 and differentiator 30 together forms an acceleration sensing unit 31, providing at output terminal 31 a rate-of-change of speed output signal. The electrical system has been shown as an example; rather than using electrical sensors of this type, mechanical acceleration sensors operating on the inertia principle of masses may also be used.

Figure 3:
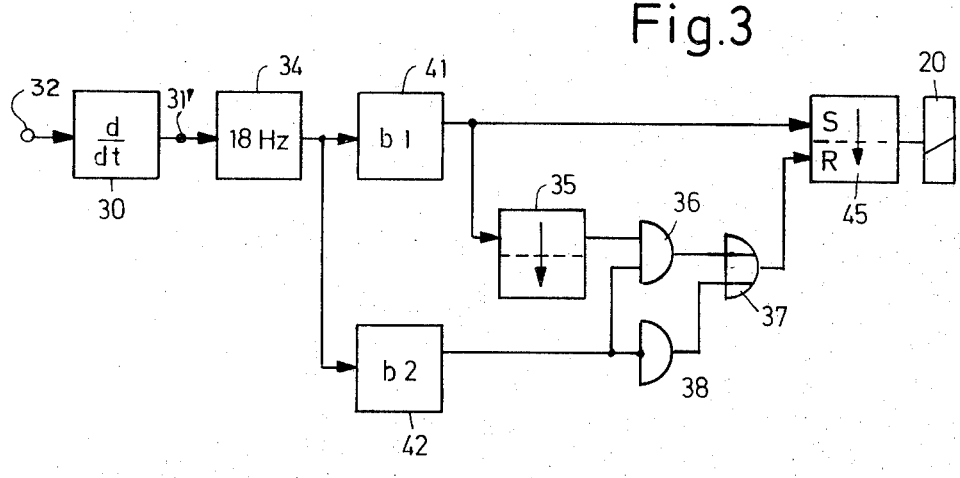
FIG. 3 is a schematic block circuit diagram of an embodiment of the invention.

Referring to FIG. 3: Only the differentiator 30 of acceleration signal generator 31 is shown, the other elements being similar to those in FIG. 2, for example. A low pass filter 34 is connected to the output terminal 31' of the acceleration signal generator 31. Low pass filter 34 has its output connected to the inputs of two threshold switches 41, 42, respectively. The output of the first threshold switch 41 is connected to the SET input S of a storage device 45, and further to the trigger input of a monostable flip-flop (FF) 35. The output of the monostable FF 35, and the output of the second threshold switch 42 are both connected to the inputs of an AND-gate 36. The RESET terminal R of storage device 45 is energized over an OR-gate 37, which has inputs applied either from AND-gate 36 or from an inverter 38, shown as a single input AND-gate with inverting input. Inverter 38 is connected to the output of threshold switch 42. The output of the storage device 45 controls the solenoid winding 20 of the valve 13.

Storage device 45 is actually a monostable flip-flop, having, however, a reset terminal to reset the flip-flop in advance of the expiration time of its unstable state. FF 45 is built as a monostable FF for safety reason. In ordinary operation, the monostable FF is alternately controlled by the two inputs and acts like a normal bistable flip-flop. If, however, the element 45 should be set by an extraneous disturbance or noise pulse, not due to blocking of the rear wheels of the vehicle, prolonged drainage of brake fluid from the brakes is prevented by the automatic reset feature, that is, the monostable characteristics of FF 45. Likewise, if the FF 45 had been set by a control pulse but, for some reason, the reset pulse is missing, the FF will reset automatically. The time delay of automatic resetting of FF 45 is, preferably, in the order of about 400 to 500 milliseconds, so that any pressure drop due to stray pulses is automatically terminated after this time lapse.

Low pass filter 34 has an upper limiting frequency of about 18 Hz. Thus, the output from low pass filter 34 is delayed with respect to the output signal of differentiator 30 by about 15 milliseconds. Stray and noise pulses are, however, effectively filtered so that the threshold switches 41, 42 are not triggered by erroneous responses. As a measure for vehicle circumferential wheel acceleration, the acceleration of gravity, g, of about 10 m/s$^2$ will be used as a basis. The threshold switching level at which threshold switch 41 changes state is set to be $-3g$; the switching threshold $b2$ of the second threshold switch 42 is set to be $+1g$. For the time that the rear wheels 34 are not accelerated, so that differentiator 30 provides an output signal of zero, both threshold switches 41, 42 provide 0-signals, that is, their outputs are on ground or chassis voltage.

In ordinary braking operaion, rear wheels 24 do not lock and a maximum vehicle deceleration of $-1g$ is usual, assuming a dry road. Maximum wheel deceleration, without locking, is likewise about $-1g$. If the master brake cylinder is operated excessively, so that the pressure in the brake line 12 and the wheel cylinders 14, 15 rises excessively, rear wheel 24 will begin to lock. The switching threshold $b1$ of $-3g$ is passed, and the first threshold switch 41 will provide a 1-signal at its output, that is, the output changes to positive voltage. The set input S is now activated and FF 45 is set, causing energization of solenoid winding 20 which changes over the position of valve 13. Communication between pressure line 12 and wheel brake cylinders 14, 15 is interrupted and the wheel brake cylinders 14, 15 are connected to the drain or sump 17. This lowers braking pressure $p$ in the wheel brake cylinders 14, 15, the braking effort decreases, and the rear wheels accelerate. The acceleration of the rear wheels will increase with decrease in braking effort.

Monostable FF 35 provides a 1-signal at its output for about 60 milliseconds upon response of the first threshold switch. The function of monostable FF 35 is to distinguish between two different road conditions, so that the anti-skid or anti-locking system of FIG. 3 can respond to different road conditions. If the road is dry, the braked wheels are rapidly accelerated as the braking pressure decreases, and sooner than the 60 milliseconds timing period of FF 35 after response of the first threshold switch 41, the wheel acceleration will pass the threshold level $b2$ of $1g$ of the second threshold switch. The output of the monostable FF 35 as well as the output of the second threshold switch 42 will have a 1-signal, so that AND-gate 36 will provide a 1-signal over OR-gate 37 to reset storage device 45 and interrupt energization of winding 20 and hence drainage of brake fluid through valve 13. The braking pressure in the wheel brake cylinders 14, 15 can rise again. Due to the rise in braking pressure, wheel acceleration decreased rapidly and the wheel will begin to decelerate, until the threshold level of $-3g$ of threshold switch $b1$ is passed again. The cycle will thus repeat.

If the raod should have become slippery or smooth, the re-acceleration of the rear wheels will require more time than the time duration of the output pulse of monostable FF 35. Monostable FF 35 thus has changed back to its quiescent state when the switching threshold $b2$ of $1g$ of second threshold switch is being passed in positive direction. AND-gate 36 therefore only has a single 1-signal applied from the second threshold switch 42, and provides a 0-signal. Although the threshold level b2 of switch 42 has been passed, braking pressure decreased. The re-acceleration of the braked wheels will then decrease and eventually the threshold level $b2$ of second threshold switch 42, that is, the level of $+1g$ will be passed in a decreasing direction. At this point only it can be assumed that even on a smooth or slippery road, the wheel speed of the braked wheels 24 is approximately the same as that of the vehicle speed. After the threshold level of switch 42 has been passed in a negative direction, the second threshold switch 42 provides a 0-signal which is inverted in inverter 38 into a 1-signal, conducted through OR-gate to reset FF 45. Upon resetting, winding 20 is de-energized, and pressure valve 13 reverts to quiescent condition. The pressure valve 13 thus also changes on smooth roads periodically or cyclically between its quiescent state and its operated state. The difference in operation between a smooth or slippery road and a dry road having normal friction is essentially in the time during which the braking pressure $p$ decreases. On slippery roads, braking pressure $p$ decreases for a longer period, namely until the threshold switch 42 reverts again to 0-signal; as a result, a lower average or medium braking pressure $p$ will obtain in the wheel brake cylinders when the road surface is smooth or slippery.

The embodiment of FIG. 4 is specifically designed for a vehicle with front wheel drive in which the rear wheels do not have a differential. Both of the rear wheels, therefore, have pulse sources associated therewith, similar to pulse transducer 27, and each one of the pulse transducers is connected to its own channel including a converter 128, 129. The outputs of the frequency-d-c converters 128, 129 are connected to the inputs of an averaging stage 154 and additionally to the inputs of an extreme value circuit 155 The outputs of the averaging stage or circuit 154 and of the extreme value circuit 155 are connected to inputs of a comparator 156.

Differentiator 130 has its input connected to the output of the averaging circuit 154. Its output is connected to the inputs of a first low pass filter 133 and a second low pass filter 134. First low pass filter 133 is connected to the input of the first threshold switch 141. Second low pass filter 134 is connected to the input of the second threshold switch 142. The outputs of the first threshold switch 141 and of comparator 156 are connected to an OR-gate 153 which, in turn, connects to the set input S of storage device 145. The network of the monostable FF 135, AND-gate 136, inverter 138 and OR-gate 137 is similar to that of the first example in accordance with FIG. 3, with the same elements as in FIG. 3 having been given the same reference numerals, incremented by 100.

Averaging circuit 154 includes a transistor 540 connected as emitter follower, having its collector connected to a positive supply bus 60. Its emitter is connected over a resistor 543 to negative supply bus 61. The two frequency-d-c converters 128, 129 are connected over input resistors 541, 542 with the base of transistor 540.

The extreme value circuit 155 has two diodes 551, 552, the anodes of which are connected to the outputs of the frequency-d-c converters 128, 129. The cathodes of diodes 551, 552 are connected together and form the outputs of the extreme value circuit 155. They are connected by resistor 554 to negative bus 61. To compare the output of the averaging stage 154 and of the extreme value circuit 155, a comparator circuit 156 including operational amplifier 560 is connected to the circuits 154, 155. Operational amplifier 560 has its non-inverting input connected to the output of averaging stage 154. The inverting input is connected over an input resistor 566 to the output of extreme value circuit 155. The output of operational amplifier 560 is connected over a resistor 561 to positive bus 60 and over a resistor 562 to the base of transistor 563. Transistor 563 is a signal inverter and is connected with its emitter to the negative bus 61 and its collector, over a resistor 564, to positive bus 60. The collector of transistor 563 forms the output of comparator 156. It is connected over a feedback resistor 565 to the inverting input of operational amplifier 560.

The threshold level $b1$ of first threshold switch 141 is set to be $-1.5g$; the threshold level $b2$ of the second threshold switch 142 is set at $+1g$, similar to the example of FIG. 3. The first low pass filter 133 has an upper limiting frequency of 6 Hz and the second low pass filter has an upper limiting frequency of 18 Hz.

operation: Disregarding the extreme value circuit 155 and comparator 156 results in a system which is similar in operation to that of FIG. 3. The junction point of the resistors 541, 542 provides a voltage which is equal to the means or average of the output voltages of the two converters 128, 129. This mean or average voltage is applied to emitter follower 540. The averaging circuit 154 thus has the same effect as the differential 25 of the vehicle in FIG. 3.

The upper limiting frequency of low pass filter 133 and the switching threshold $b1$ of first threshold switch 141 are so matched together that the same input switching delay is obtained, in ordinary control cycles of the anti-lock system, as in the first example. If, for example, the output signal of differentiator 130 changes suddenly to the value corresponding to $-3g$, then, with a time delay of about 15 milliseconds, the second low pass filter 134 (limiting frequency 18 Hz) will likewise have a signal of $-3g$. After a similar time delay of 15 milliseconds, the output of the first low pass filter 133 (limiting frequency 6 Hz) will have a signal corresponding to only $-1.5g$ applied. This signal, however, is sufficient in order to cause the first theshold switch 141 to respond.

When the wheel deceleration passes $-3g$, which leads to locking of the wheel, the first threshold switch 141 will respond equally fast as in the first example. Additionally, the reliability of response is increased. It may occur that the driver, on a very smooth road, brakes only gradually and carefully. The braking pressure rises only slowly and reaches a limited value which may, however, under the driving conditions be excessive and lead to a deceleration of the rear wheels so that they will eventually lock at a deceleration rate of, for example, $-2g$. The rear wheels are then locked, yet the first threshold switch 41 (FIG. 3) which has a threshold level of $-3g$ has not yet responded. Such small deceleration of $-1.5$ to $-2g$ causes the system of FIG. 4 to respond after some delay, caused by the low band pass width of filter 133. The response then will be at about $-1.5$ to $-2g$, with a delay time of about 60 to 80 milliseconds; thereafter, first threshold swtich 141 will respond. The braking pressure applied to the wheel cylinders is reliably decreased by setting of element 145.

The extreme value circuit 155 and comparator 156 are provided to account for unsymmetrical road conditions. For example, if the vehicle runs on a surface in which the right rear wheel is in a puddle of water, but the left rear wheel is on quite dry road surface, a deceleration or retardation of the right wheel of about $-2g$ may occur, whereas the left wheel, on dry road, will be decelerated to only about $-0.8g$. The averaging stage 154 then provides an output signal of $-1.4g$, that is below the threshold response level of the first threshold switch 141. Threshold switch 141 will therefore not respond, and yet the right rear wheel will lock. When the rear wheel is locked, the average value of the two wheel speeds is only half that of the circumferential speed of the faster wheel. A direct current, proportional to wheel circumferential speed of the fastest wheel is then available at the output of the extreme value circuit 155, since of the diodes 551, 552 that one will be conductive which has its anode at the higher voltage.

As soon as the output voltage of the averaging circuit 154 differs from the output voltage of the extreme value circuit 155 by a predetermined amount, comparator 156 will respond. Operational amplifier 560 will provide a 0-signal at its output when the averaging circuit 154 provides an output voltage below that of the extreme value circuit 155 by a predetermined amount. The 0-signal from operational amplifier 560 blocks transistor 563, and its collector will provide a 1-signal which sets the storage FF 145 over OR-gate 153. Braking pressure is decreased, therefore, as soon as the average value of wheel circumferential speed differs by a predetermined amount from the circumferential speed of the faster one of the wheels being braked. The difference can be set by proper dimensioning of resistors 554 and 566. The voltage drop across diodes 551, 552 must be considered; this voltage drop, in silicon diodes, is about 0.7 V.

The anti-lock system, as described, reliably provides for optimum slippage of the rear wheels, while preventing locking of the wheels. Anti-lock systems which are effective only on the rear wheels or rear axle are usually used only if good stabilization of a motor vehicle is to be obtained with minimum expense, and when an anti-lock system for all vehicle wheels would be too expensive. The most simple solution is that illustrated in FIG. 3. It requires only a single low pass filter. If an additional low pass filter with an upper frequency of about 6 Hz is used, then slow locking of the rear wheels upon careful braking on a slippery surface is also reliably avoided. Both examples match average braking pressure to road condition, since the time required for re-acceleration of the rear wheels is measured by the monostable flip-flop 35. Braking pressure can be decreased when only one of the rear wheels is locked by utilizing an extreme value circuit and comparing the output of the extreme value circuit with average output. This requires, however, a separate speed transducer for each wheel. This is a necessity when the rear wheels are braked in front wheel drive vehicles; it can be used, however, also with vehicles having rear wheel drive.

Various changes and modifications may be made within the inventive concept and features described in connection with any one of the embodiments may be used with the other embodiments, within the scope of the invention.

We claim:

1. Vehicle wheel pressure fluid brake anti-lock system comprising
    means (31; 27, 28, 30, 130) sensing wheel speed rate of change;
    a pressurized fluid brake system (10, 11, 12, 13, 14, 15, 17, 18, 19) having fluid control valve means (13, 20) connecting pressurized fluid to the wheel brake cylinders, or draining pressurized fluid from the brake cylinders;
    first threshold switch means (41) responsive to wheel deceleration and providing a wheel deceleration signal at a first threshold level;
    second threshold switch means (42) responsive to wheel acceleration and providing a wheel acceleration signal at a second threshold level; a controlled switch (45) connected to be responsive to said threshold switches (41, 42) to change between two states when the threshold levels of the respective threshold switches are passed and thus storing a representation of said threshold levels, said switch being connected to and controlling operation of said valve means;
    the switch (45) having a set input (S) and a reset input (R), the first threshold switch (41) being connected to the set input;
    a timing circuit (35) connected to start a timing interval upon response of the first threshold switch (41);
    and logic means (36; 37, 38) connecting the output of the second threshold switch (42) and said timing circuit (35) to the reset input (R) of said switch (45) to
    a. reset the switch (45) during said timing period when the second threshold switch (42) responds, indicative of rapid wheel re-acceleration and hence grip of wheel on the road, to permit rise in braking pressure, and
    b. if the wheel has not accelerated within said timing period, to cause response of said second threshold switch (42) with said timing period, then control resetting of said switch (45) and hence again permit rise in braking pressure only when acceleration of the wheel has dropped below the second threshold level indicative that acceleration of the wheel is decreasing.

2. System according to claim 1, wherein the pressurized fluid brake system includes a master brake cylinder (10, 11) a wheel brake cylinders (14, 15) and a fluid sump (17);
    and wherein the valve means (13, 20) comprises a 3/2 way valve connected in the fluid circuit to connect, when in rest position, the master brake cylinder (10, 11) with the wheel brake cylinders and to connect the wheel brake cylinder to the fluid sump when in operated condition.

3. System according to claim 2, wherein the first threshold switch (41) controls change of state of said controlled switch (45) in a direction to effect operation of said valve to connect the wheel brake cylinders to the fluid drain (17).

4. System according to claim 1, wherein logic means (36; 37, 38) connects the inverted output of the second threshold switch (42) and the conjunctive output of said timing circuit (35) and said second threshold switch (42) disjunctively to control said controlled switch (45).

5. System according to claim 1, for use in an automotive vehicle having a driven shaft (26) and a differential (25) connected to the driven wheels to be braked;
    and wherein the means sensing the wheel speed rate of change comprises
    a pulse source (27) associated with said driven shaft (26) and providing an output signal representative of wheel speed, and a differentiator (30) differentiating the wheel speed signal to provide a wheel rate of change of speed output signal.

6. System according to claim 1, wherein the system is applied to an automotive vehicle having wheels adapted to be braked which can have speeds independent from each other;
    wherein a transducer (26, 27, 28) is associated with each wheel, and providing an output signal representative of individual wheel speeds;
    an averaging circuit (154) is provided having the wheel speed signals applied thereto and providing an output signal representative of average wheel speed;
    and a differentiating circuit (130) is connected to the output of the averaging circuit (154) to provide the wheel speed rate of change signal.

7. System according to claim 1, further comprising a low pass filter (34) connecting the wheel speed rate of change sensing means (31) to the threshold switches.

8. System according to claim 7, wherein the upper limiting frequency of the low pass filter is about 18 Hz.

9. System according to claim 1, comprising two low pass filters (133, 134) having their inputs connected to the wheel speed rate of change sensing means;
    the first threshold switch (41) being connected to the output of the first low pass filter (133) and the second threshold switch (142) being connected to the output of the second low pass filter (134).

10. System according to claim 9, wherein the low pass filters have different maximum pass ranges, the upper pass range of the first low pass filter (133) to which the first threshold switch (141) is connected having a lower upper frequency limit than the second low pass filter (134).

11. System according to claim 6, further comprising an extreme value circuit (155) having the outputs of the wheel speed transducer means (26, 27, 28, 128, 129) applied thereto and providing an output representative of the highest wheel speed;

a comparator (156) having the outputs of the averaging circuit (154) and of the extreme value circuit (155) applied thereto and connected to compare said outputs and providing an output signal when the difference between the average speed of the wheels, and the extreme speed of one wheel exceeds a predetermined limit;

and connection means (153) controlling the valve means (13) to drain pressurized brake fluid from the brakes when the comparator indicates that a difference between average wheel speed and maximum wheel speed is present which exceeds said predetermined difference.

12. System according to claim 11, wherein the connection means comprises an OR-gate (153) having one input connected to the comparator and another input connected to the output of said first threshold switch.

13. System according to claim 6, wherein the averaging circuit comprises a transistor (540) in emitter follower circuit, having an emitter resistor (543);

and a resistor, each, (541, 542), connecting the base of the transistor to the respective transducer means (26, 27, 28; 128, 129) providing each a signal representative of respective wheel speed.

14. System according to claim 11, wherein the extreme value circuit comprises a pair of diodes (551, 552), one each connected to the transducer means (26, 27, 28; 128, 129) providing the wheel speed signals representative of speed of the respective wheels;

the diodes being further connected in parallel at their output to provide a signal at their common output which is representative of the maximum signal applied to the inputs of the diodes.

15. System according to claim 11, wherein the comparator (156) includes an operational amplifier (560) having one input connected to the output of the averaging circuit (154) and the other input to the output of the extreme value circuit (155);

a transistor (563) connected to the output of the operational amplifier, the collector of said transistor forming the output of the comparator circuit (156);

and a feedback resistor (565) connecting the collector of the transistor and the inverting input of the operational amplifier (560).

16. System according to claim 1, wherein the controlled switch (45) comprises a monostable multivibrator circuit (45) having an unstable time of a duration which is longer than the expected re-acceleralion of a wheel of the vehicle when vehicle braking is commanded by the vehicle operator, energization of the reset input (R) to reset the monostable circuit to stable state under control of said logic means being in advance of inherent change of state due to the monostable characteristic of said switch to provide for automatic reset after said unstable time duration, and hence termination of drainage of pressurized brake fluid regardless of presence of energization of the reset input (R) of said switch (45).

17. System according to claim 16, wherein the unstable time of the monostable circuit (45) is about 400 to 500 milliseconds.

* * * * *